(12) United States Patent
Karaki (10) Patent No.: US 12,422,167 B2
(45) Date of Patent: Sep. 23, 2025

(54) HOT WATER APPARATUS

(71) Applicant: NORITZ CORPORATION, Hyogo (JP)

(72) Inventor: Tatsuya Karaki, Hyogo (JP)

(73) Assignee: NORITZ CORPORATION, Hyogo (JP)

(*) Notice: Subject to any disclaimer, the term of this patent is extended or adjusted under 35 U.S.C. 154(b) by 120 days.

(21) Appl. No.: 18/451,832

(22) Filed: Aug. 17, 2023

(65) Prior Publication Data
US 2024/0077230 A1 Mar. 7, 2024

(30) Foreign Application Priority Data
Sep. 2, 2022 (JP) .................................. 2022-139696

(51) Int. Cl.
*F23N 5/12* (2006.01)
*F24H 1/12* (2022.01)

(52) U.S. Cl.
CPC .................................... *F24H 1/124* (2013.01)

(58) Field of Classification Search
CPC ... F24H 5/12; F24H 5/24; F24H 5/123; F24H 5/126; F24H 5/242; F24H 5/245; F24H 1/10
See application file for complete search history.

(56) References Cited

U.S. PATENT DOCUMENTS

| | | | |
|---|---|---|---|
| 10,006,659 B2* | 6/2018 | Ojiro | F24H 1/34 |
| 10,718,513 B2* | 7/2020 | Takeuchi | F23D 14/02 |
| 10,767,862 B2* | 9/2020 | Ojiro | F23N 5/12 |
| 11,384,935 B2* | 7/2022 | Karaki | F23N 5/123 |
| 2019/0032915 A1* | 1/2019 | Ono | F23D 14/145 |

FOREIGN PATENT DOCUMENTS

| | | | |
|---|---|---|---|
| JP | 2020016420 | | 1/2020 |
| JP | 2020051637 | | 4/2020 |
| JP | 2020051670 A | * | 4/2020 |

* cited by examiner

*Primary Examiner* — Gregory A Wilson
(74) *Attorney, Agent, or Firm* — JCIPRNET (57) ABSTRACT

A flame rod of a hot water apparatus is attached to a side wall part of a case that surrounds a combustion region such that an insulator part is positioned on a downstream side of a burner port plate of a burner in a combustion gas flow direction. A core wire part includes an extending part extending from the insulator part toward the burner port plate, and a tip-side part positioned closer to a tip of the core wire part than the extending part. In the combustion gas flow direction, the tip-side part of the core wire part is opposed to at least one of burner ports, and the extending part is not opposed to any of the burner ports.

6 Claims, 6 Drawing Sheets

HOT WATER APPARATUS

CROSS-REFERENCE TO RELATED APPLICATION

This application claims the priority benefit of Japan application serial no. 2022-139696, filed on Sep. 2, 2022. The entirety of the above-mentioned patent application is hereby incorporated by reference herein and made a part of this specification.

BACKGROUND

Technical Field

The disclosure relates to a hot water apparatus such as a hot water supply apparatus.

Related Art

Patent Document 1 (Japanese Patent Application Laid-Open No. 2020-16420) and Patent Document 2 (Japanese Patent Application Laid-Open No. 2020-51637) have disclosed specific examples of a hot water apparatus. The hot water apparatus described in Patent Documents 1 and 2 includes a burner and a heat exchanger for heating hot water, and the burner is attached with a flame rod. The burner is of a total primary air combustion type and includes a burner port plate provided with a plurality of burner ports, and a mixed gas of fuel gas and air is supplied to a back side of the burner port plate. The mixed gas passes through the plurality of burner ports to burn in a region on a surface side of the burner port plate. With the heat exchanger recovering heat from this combustion gas, hot water heating (generation of hot water) is performed. The flame rod serves to detect flame of the burner using electrical conductivity of the flame, and includes a core wire part having electrical conductivity that is held by an insulator part.

In Patent Documents 1 and 2, the flame rod is attached to a housing of the burner that holds the burner port plate of the burner, and the entire core wire part is arranged close to the burner port plate. However, for reasons of simplifying the structure of the hot water apparatus or other reasons, there may be a desire to attach the flame rod to a side wall part of a case of the heat exchanger rather than to the case of the burner. In that case, the insulator part of the flame rod is arranged apart from the burner port plate at a relatively large dimension on a downstream side in a combustion gas flow direction. Also, the core wire part extends from the insulator part toward the burner port plate, and a tip part of the core wire part is arranged close to the burner port plate. According to such a configuration, during driving combustion of the burner, it is possible to bring a tip-side part of the core wire part into contact with flame, and it is possible to detect the flame.

However, in the case of the above configuration, there are issues as described below.

That is, during driving combustion of the burner, abnormal combustion may occur, and a phenomenon (lift of flame) where flame separates from the burner port plate on the downstream side in the combustion gas flow direction may occur. Thus, in the case where such a lift of flame occurs, although this flame does not come into contact with the tip-side part of the core wire part of the flame rod, there is a risk that it would come into contact with other portions (e.g., base end part close to the insulator part) of the core wire part. This would result in an erroneous determination that normal driving combustion is taking place even though the burner is not being normally driven for combustion, and it is desired that such a phenomenon can be appropriate resolved.

SUMMARY

A hot water apparatus provided according to an embodiment of the disclosure includes a burner, a heat exchanger, a flame rod, and a case. The burner includes a burner port plate provided with a plurality of burner ports. A mixed gas of fuel gas and air supplied to a back side of the burner port plate is capable of passing through the plurality of burner ports to burn in a combustion region on a surface side of the burner port plate. The heat exchanger is capable of heating hot water using combustion gas generated by driving combustion of the burner. The flame rod includes a core wire part having electrical conductivity and an insulator part holding the core wire part, and serves to detect flame of the burner based on contact of the core wire part with flame during driving combustion of the burner. The case includes a side wall part surrounding the combustion region. The flame rod is attached to the side wall part of the case such that the insulator part is positioned on a downstream side of the burner port plate in a combustion gas flow direction. The core wire part includes an extending part extending from the insulator part toward the burner port plate, and a tip-side part positioned closer to a tip of the core wire part than the extending part. In the combustion gas flow direction, the tip-side part of the core wire part is opposed to at least one of the plurality of burner ports, and the extending part is not opposed to any of the plurality of burner ports.

According to such a configuration, the following effects can be obtained. That is, in the case where driving combustion of the burner is normal, the tip-side part of the core wire part of the flame rod comes into contact with flame. Thus, it is possible to detect a flame using the flame rod and determine the normal driving combustion of the burner. On the other hand, in the case where the driving combustion of the burner becomes abnormal and causes a lift of flame, flame does not come into contact with the tip-side part of the core wire part of the flame rod. Further, since none of the plurality of burner ports of the burner port plate is opposed to the extending part of the core wire part, flame does not come into contact with the extending part of the core wire part, either. For this reason, according to the disclosure, while it is possible to accurately determine the normal driving combustion of the burner, it is possible to avoid mistakenly determining abnormal combustion that causes a lift of flame as normal driving combustion. As a result, it is possible to promote optimization of driving control of the burner. Furthermore, flexibility regarding the attachment spot of the flame rod can also be increased.

In an embodiment of the disclosure, the heat exchanger may include the case and a plurality of stages of body pipes. The plurality of stages of body pipes extend in a direction intersecting with the combustion gas flow direction along the side wall part of the case, and are arranged side by side at intervals in the combustion gas flow direction. The insulator part of the flame rod is attached to the side wall part of the case at a position between the plurality of stages of body pipes.

According to such a configuration, the flame rod is attached in a form that effectively uses the position between the plurality of stages of body pipes provided along the side wall part of the case of the heat exchanger. Thus, it contributes to miniaturization of the heat exchanger. Further, since it is not required to attach the flame rod to the burner, it also contributes to miniaturizing the burner.

In an embodiment of the disclosure, the plurality of burner ports may in principle be provided at the burner port plate in an arrangement of a particular pattern, and as an exception, against the particular pattern, a burner port exclusion region where arrangement of the plurality of burner ports is excluded may be provided at the burner port plate. In the combustion gas flow direction, the extending part of the core wire part may be opposed to the burner port exclusion region.

According to such a configuration, in the case where driving combustion of the burner is abnormal and a lift of flame occurs, this flame can be more reliably prevented from coming into contact with the extending part of the core wire part of the flame rod by a simple configuration. Further, in the remaining general region excluding the burner port exclusion region on the burner port plate, since the plurality of burner ports may be provided in an arrangement of the particular pattern, in this general region, the plurality of burner ports can be provided in an optimal or near-optimal form.

In an embodiment of the disclosure, as the burner port exclusion region, a pair of burner port exclusion regions arranged to be point-symmetric around a center of the burner port plate may be provided. In a case where the burner port plate is attached to a predetermined spot of the burner in either a predetermined first orientation or a second orientation rotated by 180° from the first orientation, one of the pair of burner port exclusion regions may be opposed to the extending part of the core wire part.

According to such a configuration, in the case of assembling the burner, whether the orientation of the burner port plate is set to the first orientation or the second orientation, it is possible to cause the burner port exclusion region to be opposed to the extending part of the core wire part of the flame rod. Thus, attachment errors of the burner port plate can be eliminated or reduced. In the case of a configuration different from the above configuration, for example, if the orientation of the burner port plate is mistakenly set to the second orientation while it should originally be set to the first orientation, an issue that the burner port exclusion region is not opposed to the extending part of the core wire part may occur. In contrast, such an issue is solved by the above configuration.

In an embodiment of the disclosure, in a view in the combustion gas flow direction, the plurality of burner ports may have an elongated hole shape that is long in an x-direction in which the extending part of the core wire part extends, and is short in a y-direction intersecting with the x-direction. In the view in the combustion gas flow direction, the tip-side part of the core wire part may extend in the y-direction to intersect with at least one of the plurality of burner ports.

According to such a configuration, the tip-side part of the core wire part of the flame rod can be opposed to the burner port in a form extending in the y-direction intersecting with the x-direction in which the burner port of the burner port plate extends. Thus, even if there is a slight positional deviation (error) between the tip-side part of the core wire part and the burner port, the tip-side part of the core wire part and the burner port can be appropriately opposed to each other. This contributes to improving flame detection accuracy.

In an embodiment of the disclosure, an additional laminated member in a sheet shape or a plate shape that is heat-resistant and has a porous configuration or has a porosity higher than that of the burner port plate may be laminated on the surface side of the burner port plate.

According to such a configuration, it is possible to lower the temperature of the burner port plate during driving combustion and suppress deterioration of the burner port plate and thus deterioration of the burner resulting from long-term use. Furthermore, it becomes possible to smooth a flow rate distribution of the mixed gas in a surface side region of the burner port plate and improve the flame holding performance. Even in the case where blockage occurs in the burner port opposed to the tip-side part of the core wire part of the flame rod, it becomes possible to form a slight flame on the surface side of the additional laminated member, and it is possible to expect an effect of further enhancing the detection accuracy of flame.

In an embodiment of the disclosure, in a view in the combustion gas flow direction, the plurality of burner ports may be provided in an arrangement in which a plurality of vertical columns, each formed with the plurality of burner ports arranged side by side at intervals in a y-direction intersecting with an x-direction in which the extending part of the core wire part extends, are arranged side by side in the x-direction. The tip-side part of the core wire part may be opposed to at least one of the burner ports belonging to a vertical column at an end position that is closest to the insulator part among the plurality of vertical columns.

According to such a configuration, in the view in the combustion gas flow direction, the entirety or a length dimension portion of almost the entirety of the extending part of the core wire part of the flame rod can be configured to protrude from a region provided with the plurality of burner ports toward an outer side thereof. Thus, it becomes possible to eliminate the need to provide a large area for the burner port exclusion region as a means for preventing the extending part of the core wire part from being opposed to the burner port, and it is possible to simplify the configuration.

Other features of the disclosure will become more apparent from the following description of embodiments of the disclosure with reference to the accompanying drawings.

DESCRIPTION OF THE EMBODIMENTS

Embodiments of the disclosure provide a hot water apparatus capable of appropriately determining driving combustion of a burner without mistakenly determining as normal driving combustion in the case where a lift of flame occurs.

Hereinafter, exemplary embodiments of the disclosure will be specifically described with reference to the drawings.

Figure 1:
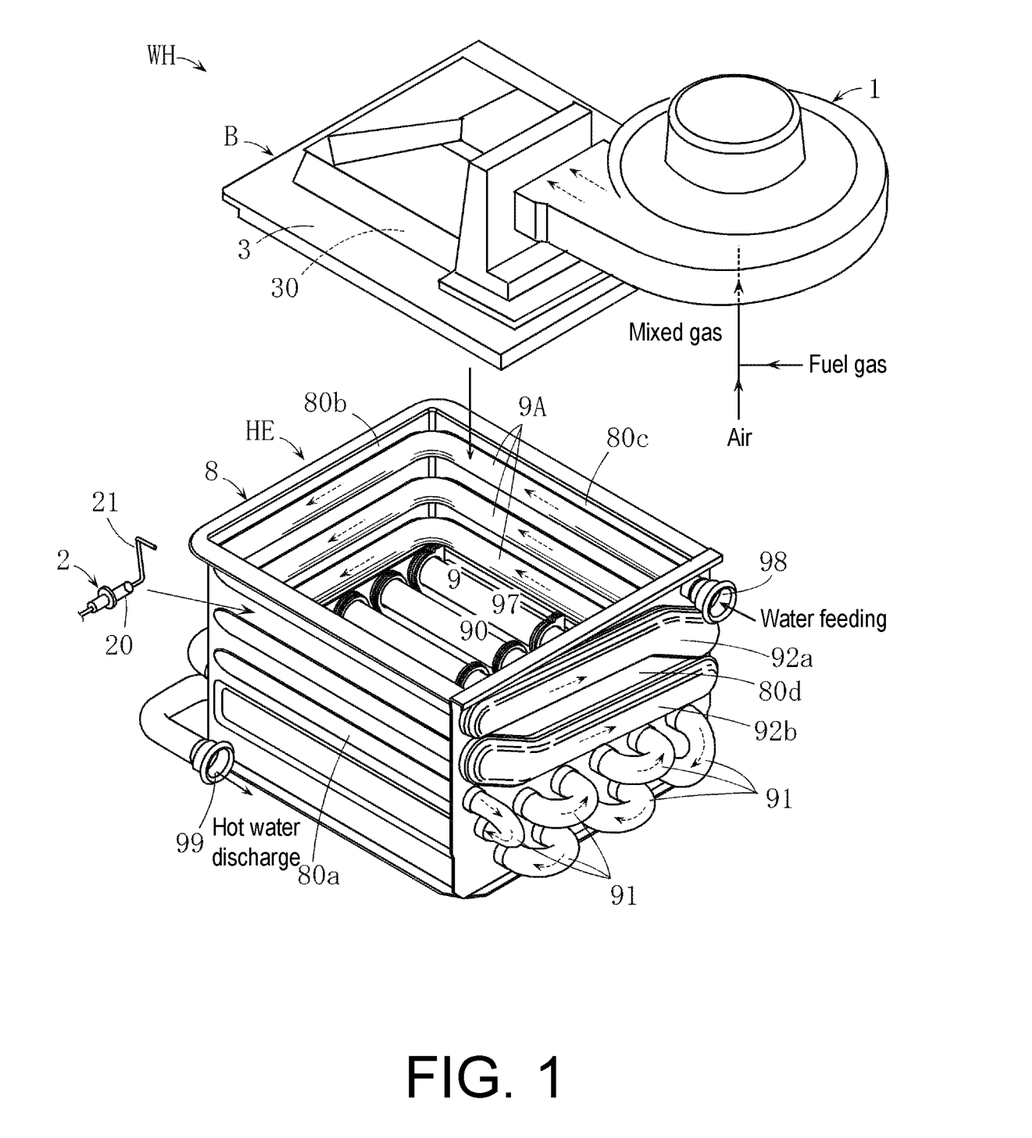
FIG. 1 is an exploded perspective view of a hot water apparatus according to the disclosure.
Figure 2:
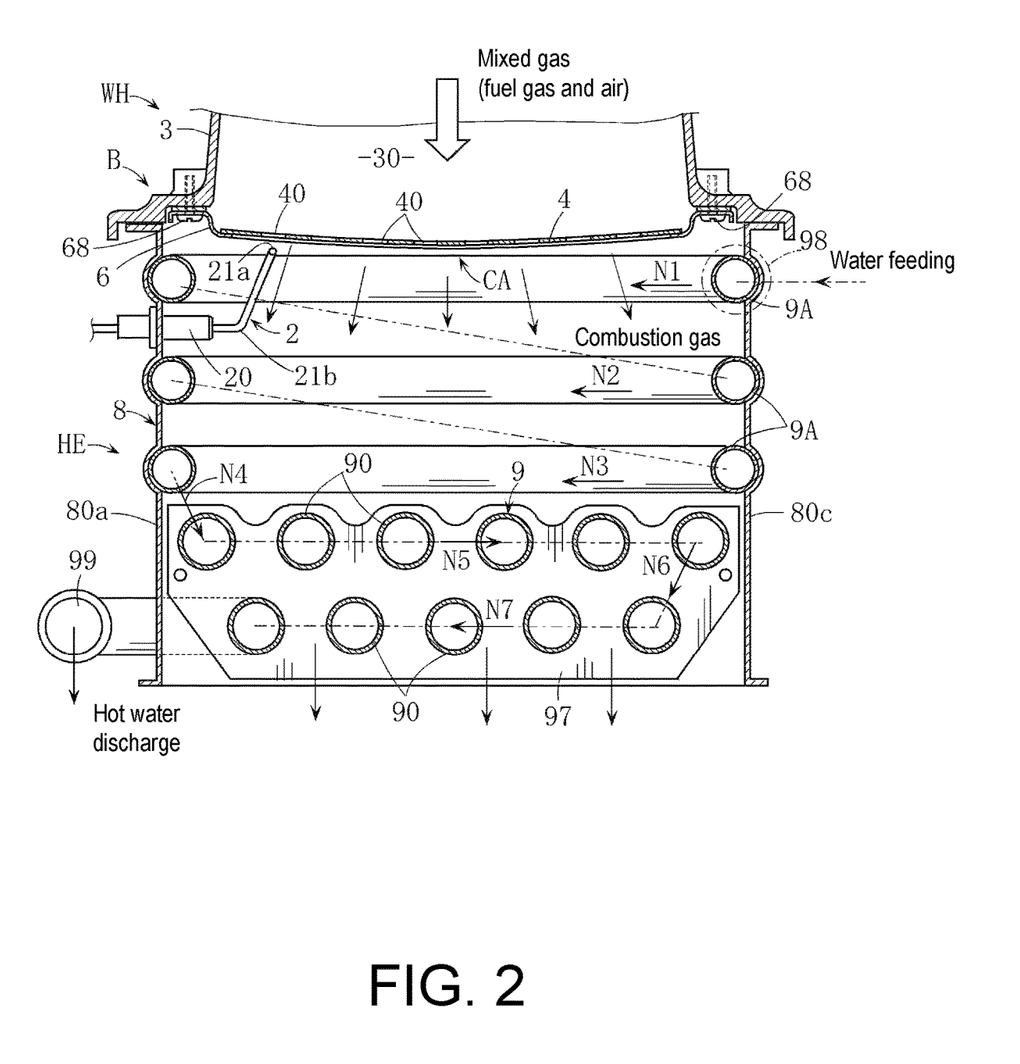
FIG. 2 is a cross-sectional view of a main part in an assembled state of the hot water apparatus shown in FIG. 1.

A hot water apparatus WH shown in FIG. 1 and FIG. 2 is a hot water supply apparatus and includes a fan 1 (omitted in FIG. 2), a burner B, a heat exchanger HE, and a flame rod 2. Details of the burner B will be described later. The burner B includes a housing 3 forming therein a chamber 30 to which a mixed gas of air and fuel gas is supplied from the fan 1, and a burner port plate 4.

The burner port plate 4 is held by a frame body 6, and a plurality of burner ports 40 in a through hole shape are provided at the burner port plate 4. The plurality of burner ports 40 have, for example, an elongated hole shape (slit shape) as shown in FIG. 3B and FIG. 4, and a dimension of the burner port 40 in a predetermined x-direction, which is a horizontal direction, is greater than a dimension in a y-direction intersecting with the x-direction. The mixed gas supplied to the housing 3 of the burner B passes downward through the plurality of burner ports 40 of the burner port plate 4 and is rectified during this passage. Ignition is performed on the mixed gas passed through each burner port 40 using an ignition plug (not shown). Accordingly, the mixed gas burns in a combustion region CA (lower surface side region) on a surface side of the burner port plate 4. A combustion gas generated by this combustion moves downward.

The heat exchanger HE is connected to a lower side of the burner B and serves to recover heat from the combustion gas that is generated by the burner B and moves downward to perform hot water heating. A conventionally known heat exchanger may be used as the heat exchanger HE, and the heat exchanger HE includes a case 8, a plurality of body pipes 9A arranged side by side at intervals in an up-down direction, and a heat transfer tube 9. The case 8 has a substantially rectangular tubular shape in a plan view having a plurality of side wall parts 80a to 80d that surround the combustion region CA of the mixed gas of the burner B and a region below the combustion region CA.

The plurality of body pipes 9A have a substantially three-sided rectangular shape in a plan view extending in a substantially horizontal direction along an inner surface side of the side wall parts 80a to 80c, and are connected in series via header flow paths 92a and 92b provided at the side wall part 80d. The heat transfer tube 9 is configured such that a plurality of straight tube body parts 90 joined to a plurality of fins 97 for heat recovery and extending in a horizontal direction are connected in series via substantially U-shaped bent tubes 91 outside the case 8.

In the heat exchanger HE, hot water is supplied from a water inlet 98 of the heat exchanger HE to an uppermost-stage body pipe 9A. This hot water then flows through a plurality of up-down stages of body pipes 9A to a lower-stage side while passing through the header flow paths 92a and 92b, as indicated by arrows N1 to N3 in FIG. 2. Next, the hot water flows through the heat transfer tube 9 (straight tube body parts 90 and bent tube 91) in a sequence as indicated by arrows N4 to N7, and reaches a hot water outlet 99. In such a process, hot water is heated by the combustion gas and is supplied from the hot water outlet 99 to a desired hot water supply destination.

The flame rod 2 serves to detect flame of the burner B using electrical conductivity of the flame, and includes a core wire part 21 having electrical conductivity made of a metal wire material, for example, and an insulator part 20 having electrically insulating properties that holds the core wire part 21. Although not shown in the figures, an electrical wiring for energization is connected to an outer end part of the core wire part 21, and the burner port plate 4 is grounded corresponding to the core wire part 21.

The insulator part 20 of the flame rod 2 is attached to the side wall part 80a of the case 8 at a position between the uppermost-stage body pipe 9A and a middle-stage body pipe 9A. A tip part of the insulator part 20 is positioned lower than the burner port plate 4 inside the case 8.

Figure 3A:
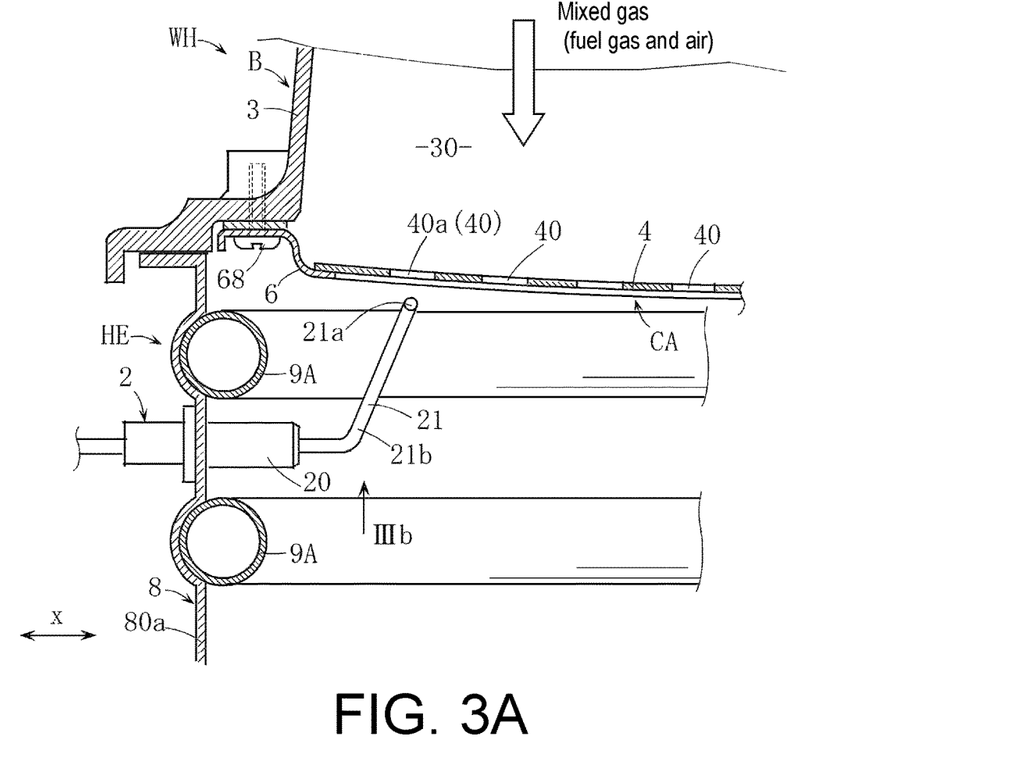
FIG. 3A is an enlarged cross-sectional view of the main part in FIG. 2.
Figure 3B:
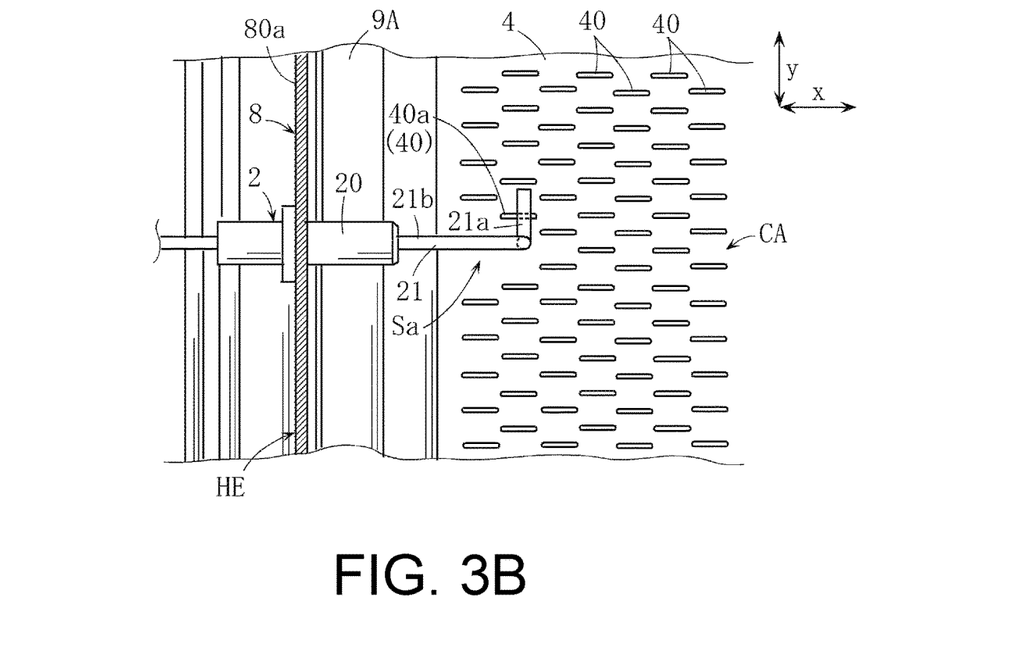
FIG. 3B is a bottom view in the direction of an arrow Mb in FIG. 3A.
Figure 4:
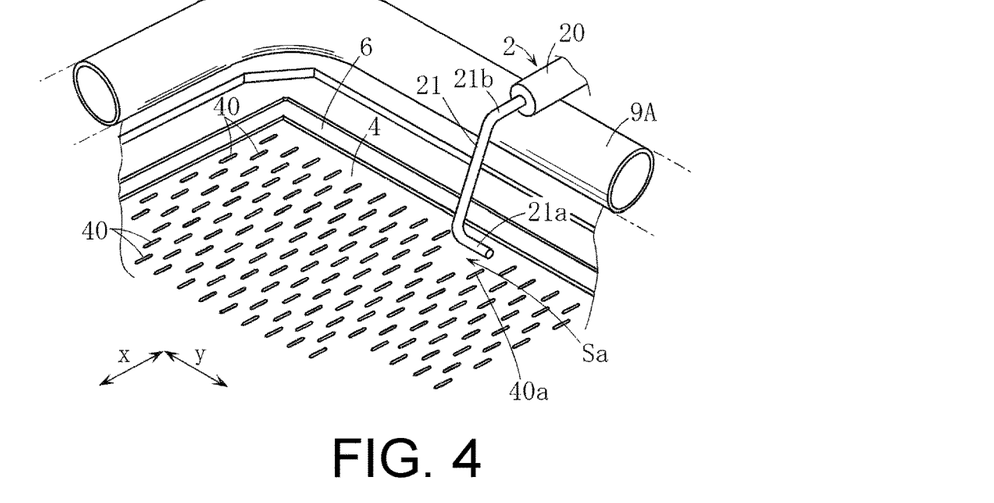
FIG. 4 is a schematic partial cross-sectional perspective view of the main part viewed from below a region shown in FIG. 3A and FIG. 3B.

The core wire part 21 includes an extending part 21b that extends upward or diagonally upward from the tip part of the insulator part 20 toward the burner port plate 4, and a tip-side part 21a that is connected in a bent shape and is positioned closer to a tip of the core wire part 21 than the extending part 21b (also see FIG. 3A, FIG. 3B, and FIG. 4). Herein, the tip-side part 21a approaches and is positioned directly below at least one burner port 40 (40a) among the plurality of burner ports 40 of the burner port plate 4, and is opposed to the burner port 40a in a combustion gas flow direction. On the other hand, the extending part 21b is configured not to be opposed to any of the plurality of burner ports 40 in the combustion gas flow direction. In a bottom view shown in FIG. 3B, the extending part 21b extends in an x-direction. On the other hand, in a bottom view, the tip-side part 21a extends in a y-direction and intersects with the burner port 40a.

In this embodiment, as a means for preventing the extending part 21b of the core wire part 21 from being opposed to any of the plurality of burner ports 40 in the combustion gas flow direction, a burner port exclusion region Sa is provided at the burner port plate 4. More specifically, in principle, the plurality of burner ports 40 are provided at the burner port plate 4 in an arrangement of a particular pattern (in this embodiment, the plurality of burner ports 40 are arranged in a staggered arrangement at predetermined pitches in the x- and y-directions). However, as an exception, against the particular pattern, the burner port plate 4 is provided with the burner port exclusion region Sa where one or more burner ports 40 that would otherwise be provided are excluded. The extending part 21b is positioned directly below the burner port exclusion region Sa to be opposed thereto.

Figure 5:
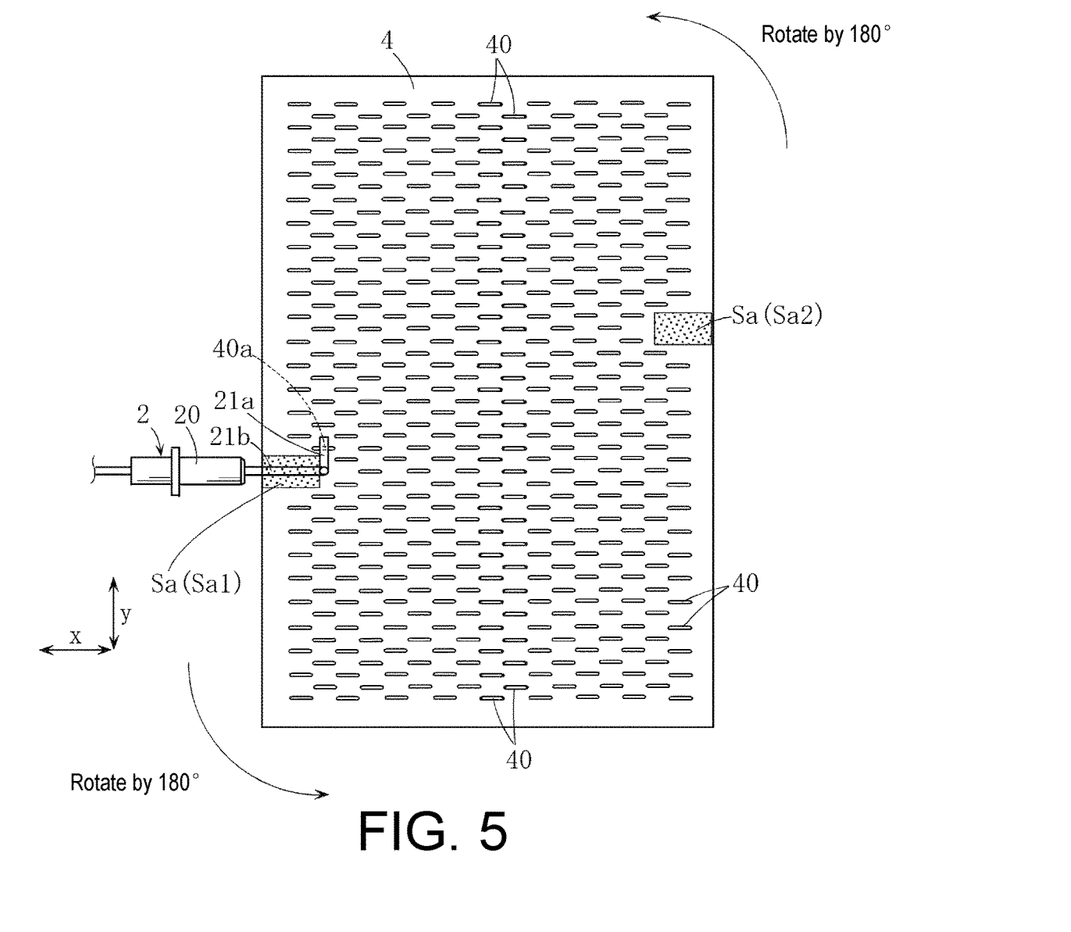
FIG. 5 is a view illustrating a relationship between a burner port plate and a flame rod, which are constituents of the hot water apparatus shown in FIG. 1 and FIG. 2.

As shown in FIG. 5, two burner port exclusion regions Sa (Sa1 and Sa2) (substantially, portions where a dotted pattern is applied) are provided at the burner port plate 4. The two burner port exclusion regions Sa are arranged to be point-symmetric around a center of the burner port plate 4. Accordingly, whether the burner port plate 4 is set in a first orientation shown in FIG. 5 or in a second orientation rotated by 180° from the first orientation, one of the pair of burner port exclusion regions Sa1 and Sa2 is opposed to the extending part 21b of the core wire part 21. According to such a configuration, in the case of assembling the burner B, it is possible to set the orientation of the burner port plate 4 to either of the first orientation and the second orientation described above, which contributes to eliminating an attachment error of the burner port plate 4.

Next, actions of the hot water apparatus WH will be described.

In the case where the burner B is driven for combustion, if the driving combustion is normal, a flame corresponding to the burner port 40a comes into contact with the tip-side part 21a of the core wire part 21 of the flame rod 2. Thus, it is possible to detect a flame using the flame rod 2 and determine the normal driving combustion of the burner B. As described with reference to FIG. 3B, in a bottom view, the tip-side part 21a of the core wire part 21 is configured to extend in the y-direction and intersect with the burner port 40a extending in the x-direction. Thus, for example, even if an error occurs in the attachment spot of the flame rod 2 and a slight misalignment occurs in the relative positional relationship between the tip-side part 21a and the burner port 40a, it is possible to appropriately oppose the tip-side part 21a and the burner port 40a to each other. Thus, it is possible to improve flame detection accuracy of the flame rod 2.

On the other hand, in the case where the driving combustion of the burner B becomes abnormal and causes a lift of flame, flame does not come into contact with the tip-side part 21a of the core wire part 21 of the flame rod 2. Further, since the burner port exclusion region Sa of the burner port plate 4 is opposed to the extending part 21b of the core wire part 21 and none of the plurality of burner ports 40 is opposed to the extending part 21b of the core wire part 21, flame does not come into contact with the extending part 21b of the core wire part 21, either. Thus, when a lift of flame occurs, no flame is detected. For this reason, according to the hot water apparatus WH of this embodiment, while it is possible to accurately determine the normal driving combustion of the burner B, it is possible to avoid mistakenly determining abnormal combustion that causes a lift of flame as normal driving combustion. This can promote optimization of driving control of the burner B.

Since the flame rod 2 is attached to the side wall part 80a of the heat exchanger HE, the attachment structure is simplified and it contributes to facilitating manufacturing and reducing the production costs. Further, the specific attachment spot of the flame rod 2 is a region of the side wall part 80a between two body pipes 9A, and since this region is effectively used, this configuration is rational and an issue of upsizing the heat exchanger HE is also appropriately avoided.

Figure 6:
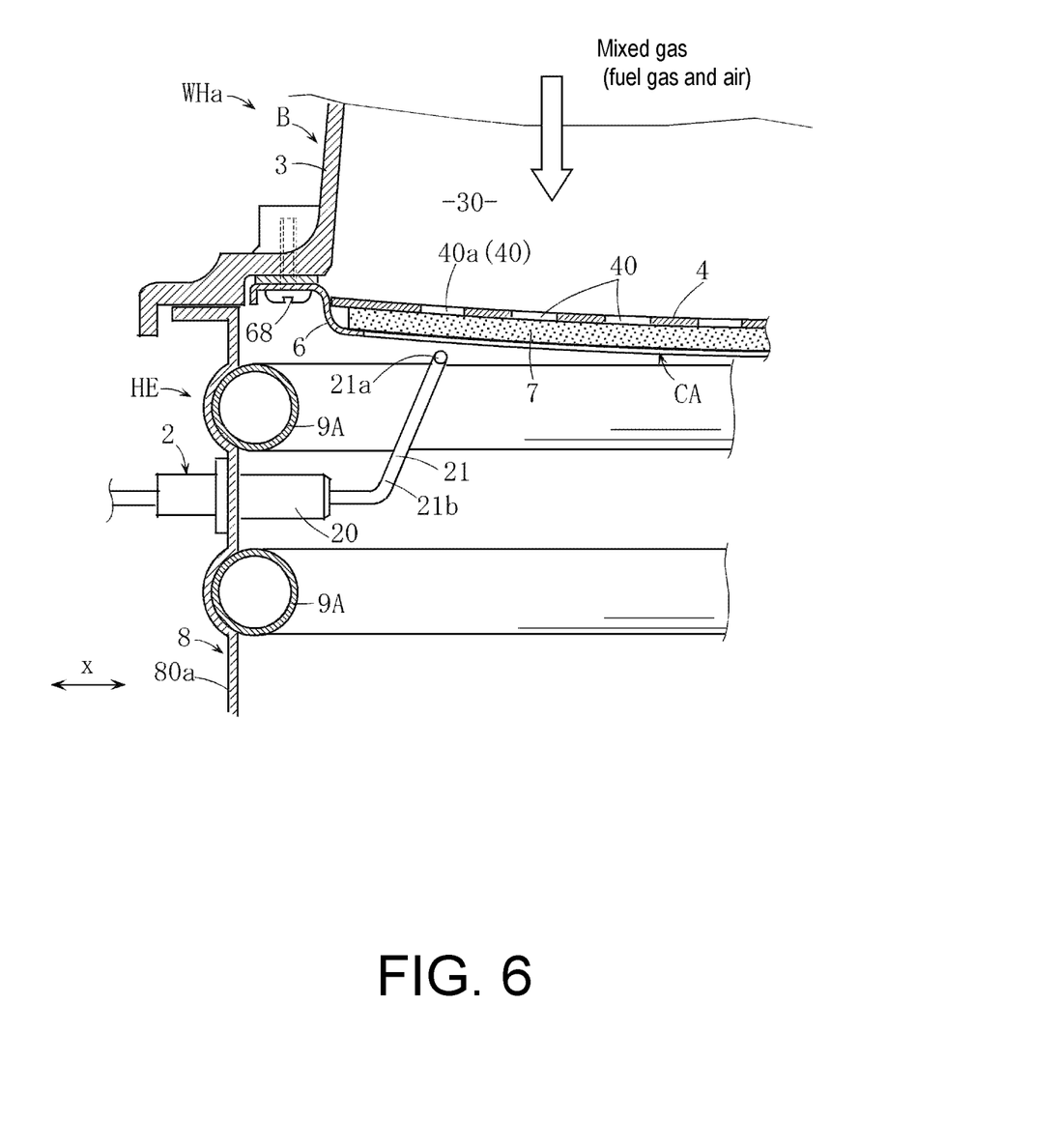
FIG. 6 is an enlarged cross-sectional view of a main part showing another example of the disclosure.
Figure 7A:
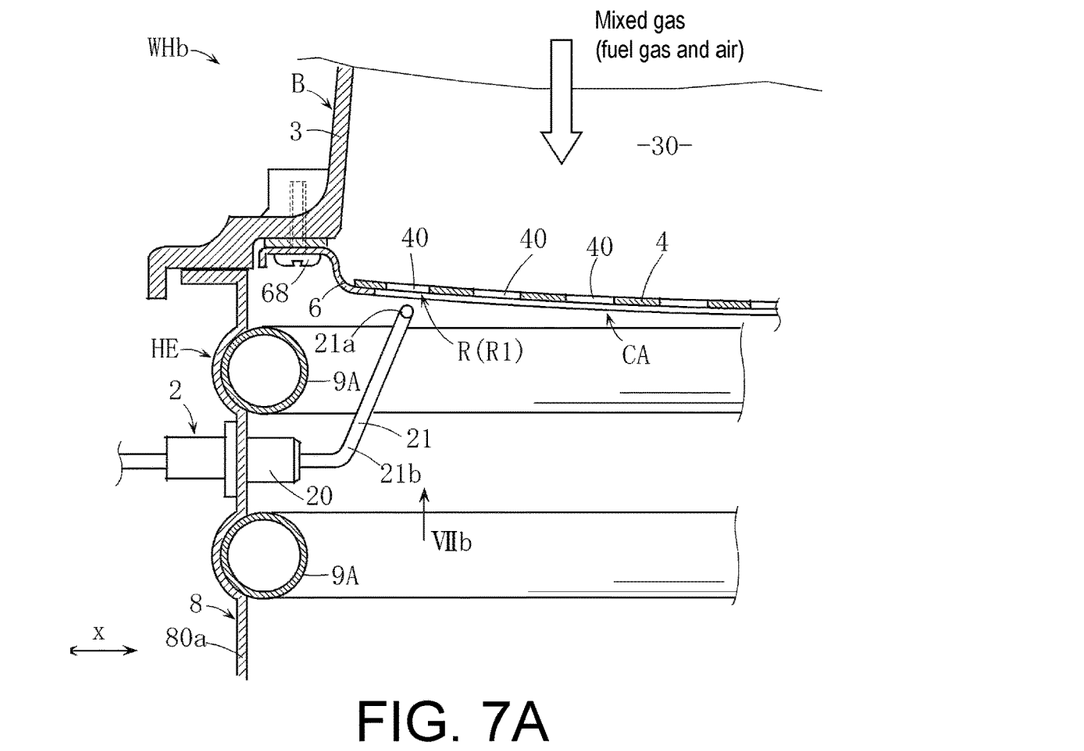
FIG. 7A is an enlarged cross-sectional view of a main part showing another example of the disclosure.
Figure 7B:
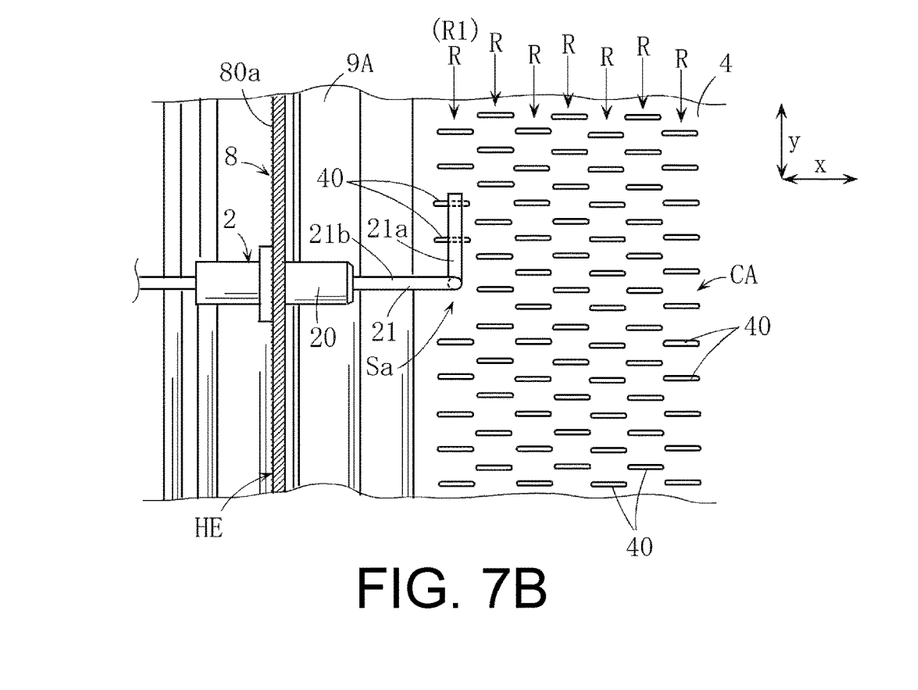
FIG. 7B is a bottom view in the direction of an arrow VIIb in FIG. 7A.

FIG. 6 to FIG. 7B show other embodiments of the disclosure. In these figures, components that are identical or similar to those in the above embodiment will be labeled with the same reference signs, and repeated descriptions thereof will be omitted.

In a hot water apparatus WHa shown in FIG. 6, an additional laminated member 7 in a sheet shape or a plate shape, which is heat-resistant and has a porous configuration or has a porosity higher than that of the burner port plate 4, is laminated on a surface side (lower surface side) of the burner port plate 4. The additional laminated member 7 is, for example, a heat-resistant fiber sheet or a heat-resistant porous ceramic plate. Preferably, a thickness of the additional laminated member 7 may be greater than a thickness of the burner port plate 4, for example.

In this embodiment as well, it is possible to obtain the same actions and effects as in the above embodiment associated with flame detection of the flame rod 2. Further, with the presence of the additional laminated member 7, it is possible to lower the temperature of the burner port plate 4 during driving combustion and suppress deterioration of the burner port plate 4 resulting from long-term use. Furthermore, it becomes possible to obtain an action that a flow rate distribution of the mixed gas in a surface side region of the burner port plate 4 becomes smooth, and it also becomes possible to improve the flame holding performance. Even in the case where blockage occurs in the burner port 40a opposed to the tip-side part 21a of the core wire part 21 of the flame rod 2, since it becomes possible to form a slight flame on the surface side of the additional laminated member 7, it is possible to expect an effect of further enhancing the detection accuracy of flame.

In a hot water apparatus WHb shown in FIG. 7A and FIG. 7B, the arrangement of the plurality of burner ports 40 of the burner port plate 4 is the same staggered arrangement as in the above embodiment, in which a plurality of vertical columns R, each formed with a plurality of burner ports 40 arranged side by side at a predetermined interval in the y-direction, are arranged side by side in the x-direction. On the other hand, the tip-side part 21a of the core wire part 21 of the flame rod 2 is opposed to the burner port 40 belonging to the vertical column R (R1) at an end position (left-end position in FIG. 7A and FIG. 7B) closest to the insulator part 20 among the plurality of vertical columns R. Preferably, the tip-side part 21a may be opposed to a plurality of burner ports 40 to ensure flame detection (this is also true in other embodiments described above).

According to this embodiment, in the bottom view of FIG. 7B, the entirety or a length dimension portion of almost the entirety of the extending part 21b of the core wire part 21 of the flame rod 2 is configured to protrude from a region provided with the plurality of burner ports 40 toward an outer side thereof. Thus, it becomes possible to eliminate the need to provide a large area for the burner port exclusion region Sa as a means for preventing the extending part 21b of the core wire part 21 from being opposed to any burner port 40, and it is possible to simplify the configuration.

The disclosure is not limited to the contents of the embodiments described above. The specific configuration of each part of the hot water apparatus according to the disclosure may be subjected to various design changes within the scope intended by the disclosure.

The specific shapes, sizes, and materials of the insulator part and the core wire part of the flame rod are not particularly limited. Further, the flame rod may be provided as a plurality of flame rods, and in that case, if at least one of the plurality of flame rods corresponds to the configuration intended by the disclosure, a hot water apparatus including this configuration is covered in the technical scope of the disclosure. In the disclosure, the insulator part of the flame rod is attached to the side wall part of the case surrounding the combustion region of the mixed gas of the burner, but this case does not necessarily have to be the case of the heat exchanger. For example, it may also be a case interposed between the heat exchanger and the burner, or a case formed by extending a part of the housing of the burner.

Each of the hot water apparatuses WH, WHa, and WHb of the above embodiments is configured as a reverse combustion type in which the combustion gas moves downward, but the disclosure is not limited thereto and may be of a forward combustion type in which, for example, the heat exchanger is arranged on an upper side of the burner, and combustion gas moves upward from the burner toward the heat exchanger. The specific configuration of the heat exchanger that constitutes the hot water apparatus is also not particularly limited. In addition to serving as a hot water supply apparatus capable of general hot water supply, bath hot water supply, or room heating hot water supply, the hot water apparatus in the disclosure is a concept covering other apparatuses having a function of generating hot water other than the function of hot water supply described above.

What is claimed is:
1. A hot water apparatus comprising:
 a burner comprising a burner port plate provided with a plurality of burner ports, wherein a mixed gas of fuel gas and air supplied to a back side of the burner port plate is capable of passing through the plurality of burner ports to burn in a combustion region on a surface side of the burner port plate;

a heat exchanger capable of heating hot water using combustion gas generated by driving combustion of the burner;

a flame rod that comprises a core wire part having electrical conductivity and an insulator part holding the core wire part, and serves to detect flame of the burner based on contact of the core wire part with flame during driving combustion of the burner; and a case comprising a side wall part surrounding the combustion region, wherein the flame rod is attached to the side wall part of the case such that the insulator part is positioned on a downstream side of the burner port plate in a combustion gas flow direction, and the core wire part comprises: an extending part extending from the insulator part toward the burner port plate; and a tip-side part positioned closer to a tip of the core wire part than the extending part, and in the combustion gas flow direction, the tip-side part of the core wire part is opposed to at least one of the plurality of burner ports, and the extending part is not opposed to any of the plurality of burner ports, wherein the plurality of burner ports are in principle provided at the burner port plate in an arrangement of a particular pattern, and as an exception, against the particular pattern, a burner port exclusion region where arrangement of the plurality of burner ports is excluded is provided at the burner port plate, and in the combustion gas flow direction, the extending part of the core wire part is opposed to the burner port exclusion region.

2. The hot water apparatus according to claim 1, wherein the heat exchanger comprises:

the case; and a plurality of stages of body pipes that extend in a direction intersecting with the combustion gas flow direction along the side wall part of the case, and are arranged side by side at intervals in the combustion gas flow direction, and the insulator part of the flame rod is attached to the side wall part of the case at a position between the plurality of stages of body pipes.

3. The hot water apparatus according to claim 1, wherein as the burner port exclusion region, a pair of burner port exclusion regions arranged to be point-symmetric around a center of the burner port plate are provided, and in a case where the burner port plate is attached to a predetermined spot of the burner in either a predetermined first orientation or a second orientation rotated by 180° from the first orientation, one of the pair of burner port exclusion regions is opposed to the extending part of the core wire part.

4. The hot water apparatus according to claim 1, wherein in a view in the combustion gas flow direction, the plurality of burner ports have an elongated hole shape that is long in an x-direction in which the extending part of the core wire part extends, and is short in a y-direction intersecting with the x-direction, and in the view in the combustion gas flow direction, the tip-side part of the core wire part extends in the y-direction to intersect with at least one of the plurality of burner ports.

5. The hot water apparatus according to claim 1, wherein in a view in the combustion gas flow direction, the plurality of burner ports are provided in an arrangement in which a plurality of vertical columns, each formed with the plurality of burner ports arranged side by side at intervals in a y-direction intersecting with an x-direction in which the extending part of the core wire part extends, are arranged side by side in the x-direction, and the tip-side part of the core wire part is opposed to at least one of the burner ports belonging to a vertical column at an end position that is closest to the insulator part among the plurality of vertical columns.

6. A hot water apparatus comprising:

a burner comprising a burner port plate provided with a plurality of burner ports, wherein a mixed gas of fuel gas and air supplied to a back side of the burner port plate is capable of passing through the plurality of burner ports to burn in a combustion region on a surface side of the burner port plate;

a heat exchanger capable of heating hot water using combustion gas generated by driving combustion of the burner;

a flame rod that comprises a core wire part having electrical conductivity and an insulator part holding the core wire part, and serves to detect flame of the burner based on contact of the core wire part with flame during driving combustion of the burner; and a case comprising a side wall part surrounding the combustion region, wherein the flame rod is attached to the side wall part of the case such that the insulator part is positioned on a downstream side of the burner port plate in a combustion gas flow direction, and the core wire part comprises: an extending part extending from the insulator part toward the burner port plate; and a tip-side part positioned closer to a tip of the core wire part than the extending part, and in the combustion gas flow direction, the tip-side part of the core wire part is opposed to at least one of the plurality of burner ports, and the extending part is not opposed to any of the plurality of burner ports, wherein an additional laminated member in a sheet shape or a plate shape that is heat-resistant and has a porous configuration or has a porosity higher than that of the burner port plate is laminated on the surface side of the burner port plate.

* * * * *